United States Patent Office 3,236,810
Patented Feb. 22, 1966

3,236,810
PROCESS FOR MODIFYING THE MOLECULAR WEIGHT OF POLYOXYMETHYLENE
Glenn Frederick Leverett and John Brockway Thompson, Wilmington, Del., assignors to E. I. du Pont de Nemours and Company, Wilmington, Del., a corporation of Delaware
No Drawing. Filed Aug. 14, 1962, Ser. No. 216,754
10 Claims. (Cl. 260—67)

This invention relates to a novel process for modifying the molecular weight of a polyoxymethylene, and, more particularly, it relates to the treatment of a substantially 100% crystalline polyoxymethylene in a mildy acidic reaction medium, and thereafter recovering a polyoxymethylene having a molecular weight greater than the starting material.

In copending application, Serial No. 785,136, filed on January 6, 1959 by Northrop Brown et al., there is disclosed a process for the preparation of polyoxymethylene ethers to provide a base stable polyoxymethylene. In that application, there is disclosed a process for increasing the molecular weight of a polyoxymethylene by treating the polymer with an orthoester, ketal, or orthocarbonate in a mildy acidic reaction medium.

It has now been discovered that the molecular weight of certain polyoxymethylenes, namely, those which are substantially 100% crystalline, may be increased by treating such polymers in an acidic reaction medium, and, preferably, wherein the acidity is derived from a Lewis acid.

It has also been discovered that certain substantially crystalline polyoxymethylenes, namely, those in which the polymer chains are terminated on one end by an alkoxyl group and on the other end by a hydroxyl group, yield a polyoxymethylene dialkyl ether when treated according to the present process in the absence of an alkylating agent.

Accordingly, it is an object of this invention to provide a process for modifying the molecular weight of such materials. Another object of the present invention is to provide a process for the preparation of a thermally stable polyoxymethylene diether. Other objects will appear hereinafter.

The above objects are accomplished by contacting a substantially crystalline, high molecular weight polyoxymethylene starting material with a mildly acidic compound, and thereafter recovering a polyoxymethylene having a molecular weight higher than that of said starting material. More particularly, the above objects are accomplished by reacting one part by weight of a polyoxymethylene starting material having substantially 100% crystallinity and a number average molecular weight of at least 10,000 with $1 \times 10^{-6}$ to 1.0 part by weight based upon the starting material of an acid, and preferably a Friedel-Crafts metal halide type of a Lewis acid, at a temperature of —50 to +175° C., and thereafter recovering a polyoxymethylene having a number average molecular weight greater than that of said starting material.

The polyoxymethylene starting material employed in the process of this invention is a substantially 100% crystalline polymer of recurring oxymethylene units (—$CH_2O$—) or a substantially crystalline polymer containing a predominance of the aforementioned group. The chain of the polymer may normally be terminated at one end by a hydroxyl group, and at the other end by an ether group, an ester group, or a second hydroxyl group.

The term "substantially 100% crystalline" refers to polymers which exhibit X-ray diffraction patterns characteristic of perfectly crystalline materials with practically no amorphous scattering of the X-rays. The foregoing definition includes polymers having a crystallinity greater than about 93% and preferably greater than about 96% by weight. These polymers may be prepared, for example, according to the processes set out in United States Patents 3,000,860 and 3,000,861, both issued to Northrop Brown et al. on September 19, 1961, by the polymerization of trioxane, or by the polymerization of trioxane or formaldehyde with other comonomers so long as a highly crystalline product is obtained.

In order to achieve a modification of the molecular weight of the polymers described hereinabove, it is necessary to contact the polymers with an acidic material. Some examples of the acid or acid-reacting compound, which may be employed within the scope of this invention, include Lewis acids, usually of the Friedel-Crafts type, such as aluminum trichloride, aluminum tribromide, aluminum triiodide, aluminum trifluoride, tin tetrafluoride, tin tetrachloride, tin tetrabromide, tin tetraiodide, ferric chloride, ferric bromide, ferric fluoride, ferrous fluoride, ferrous bromide, ferrous chloride, titanium tetrachloride, titanium tetrabromide, zinc bromide, zinc fluoride, zinc chloride, boron trifluoride, boron trichloride, boron tribromide, antimony trichloride, antimony trifluoride, antimony tribromide, antimony triiodide, antimony penetachloride, antimony pentafluoride, lead dibromide, lead difluoride, cobalt dibromide, cobalt chloride, and cobalt fluoride, protonic or Bronstead acids with a pK of less than 5.5 including sulfonic acids, such as p-toluene sulfonic acid, inorganic acids, such as sulfuric, hydrochloric, hydrofluoric, and phosphoric acid and the like. The salts of strong acids (pK less than 2.0) with weak bases may also be used, for example, an oxonium salt of sulfuric acid is operable in the present process. The acids employed in the present process should not form insoluble complexes with a reagent as in the case of a slurry process, and should not form non-volatile complexes if a diluent is used in a vapor phase process. Strong acids, and acids which are strong oxidizing or reducing agents, should be sparingly used to prevent excessive degradation of the unreacted polymer. Excessive degradation may also be avoided by adding the acid in such a manner that the contact time with the unreacted polymer is held at a minimum. The preferred range of concentration of acid catalyst is from 0.001% to 1% of the reaction medium excluding the polymer therein. The same range is preferred for their salts with weak bases. Generally, aluminum trichloride, tin tetrachloride, titanium tetrafluoride, boron trifluoride, dimethyl sulfate, and the oxonium salt of sulfuric acid are preferred since they are commercially available. Certain complexes of the aforementioned metal halides are also operable in the present invention, and may be preferred when it is desired to employ the acid in the liquid form. Such complexes which are considered within the scope of the present invention include tertiary amine complexes, and ether complexes; the preferred ether being dimethyl ether. Specific examples of other tertiary amines which may be used in the present invention include, but are not limited to, trimethyl amine, tripropyl amine, dimethyl stearylamine, dimethyl cyclohexyl amine, dimethyl butylamine, diethyl cyclohexylamine, diethyl butylamine, and pyridene. Examples of other ethers are the dialkyl ethers, such as dimethyl ether, diethyl ether, dibutyl ether, and dipropyl ether. The complex of the metal halide with a tertiary amine or ether may be prepared by mixing the respective material in a suitable solvent. The acid complex may also be prepared by adding a Friedel-Crafts metal halide to the ether. The resultant product, which is an ether complex, is more easily manipulated than some of the aforementioned gaseous metal halides.

It may be observed from the following examples that the reaction conditions for accomplishing the modification of molecular weight as set forth in the present application are not restricted, but, on the contrary, offer a wide variety of conditions which may be used in the different embodiments of this invention. For instance, the examples illustrate the fact that this modification of polyoxymethylene can be accomplished in any compatible medium in which the polymer can be intimately contacted with the desired acid. Although the polymer should not be dissolved, the medium may be a non-degrading solvent for polyoxymethylene at non-solution conditions, or it may be a non-solvent which forms a slurry with the polyoxymethylene particles, or the acid may be in the vapor phase, while the polyoxymethylene is present as a solid. Inert gases, such as nitrogen and carbon dioxide which are relatively pure, may be added as diluents in the vapor in the case where the coupling agent, i.e., the acid is in the vapor phase, while the polyoxymethylene is present as a solid during the reaction. Solvents for the polyoxymethylene when employed under non-solution conditions may be aryl halides, dimethyl formamide, dixylenol butane, halogenated phenol, while the non-solvents under most conditions may include ethers, hydrocarbons, and alkyl halides, and like compounds which are familiar to skilled chemists. Some of the solvents for the polyoxymethylene, such as dimethyl formamide, would also increase the solubility of the acid in the reaction medium and thus allow the use of acids which by themselves would not give a satisfactory reaction. The time of reaction may be as long as is necessary to reach completion without decomposing too much polymer, and with long reaction times temperatures as low as $-50°$ C. may be employed; temperatures as high as $200°$ C. may also be employed; with short reaction times. Care must be taken in all instances to avoid melting or dissolving the polymer. However, after application of the present process, the polymer may be melted as would be the case when the polymer is extruded or injection molded. The temperature, time, concentration, and strength of the acid and the efficiency of the reaction must be balanced as in most other reactions so as to cause an acceptable amount of coupling in a reasonable time. In many cases, the terminal portions of the polymer chains are susceptible to attack by acids and may be depolymerized by such an attack, therefore, it is important to adjust the time and the reaction temperature so that the depolymerization and other side reactions that take place are slow enough and yet the coupling is fast enough so that an increase in molecular weight is obtained at acceptable yields. In the preferred embodiment of the process of the present invention, the reaction temperature is between 20 and $170°$ C. The substantially 100% crystalline polyoxymethylene is in the solid phase; the preferred coupling agent, boron trifluoride, is present at a concentration of 0.005 to 5 mole percent in the vapor phase or in a solvent.

The polymer which has been treated by the process of the present invention may possess sufficient thermal stability to be molded without refining, however, in the preparation of molded objects which require an extremely thermally stable polymer, it is desirable to replace any remaining unstable end groups on the polymer chain with more stable groups, for example, an ester or an ether group. The end groups of the product of the present invention may be esterified according to the process described in United States Patents 2,964,500, issued to Jenkins et al. on December 13, 1960, and 2,998,409, issued to Dal Nogare et al. on August 29, 1961; and one or more of the terminal groups may be etherified according to the processes described in copending applications Serial No. 682,325, filed by N. Brown et al. on September 6, 1957, and Serial No. 785,136, now Patent No. 3,161,616, December 15, 1964, filed by N. Brown et al. on January 6, 1959, and in United States Patents 3,000,860 and 3,000,861, both issued to N. Brown et al. on September 19, 1961.

The structures of the products made by the processes of the present invention will naturally depend in part on the structure of the starting material. Still other structural variations may be subsequently introduced by application of one or another of the above stabilization procedures.

The following description illustrates some of the various products which may be obtained by the present process and is presented for clarification only, with the understanding that other polymers may have different reactions. One of the preferred starting materials for the process of our invention is a highly crystalline polymer prepared according to the processes set out in United States Patent 3,000,860 which has a predominance of chains of the general formula

$$R\text{---}O\text{---}(CH_2\text{---}O)_nH$$

wherein R may be an alkyl, cycloalkyl, or aralkyl radical, though preferably a methyl radical, and $n$ is an integer preferably 300 or larger. Polymer molecules having this combination of end groups are hereinafter referred to as Type A structures.

Another preferred, highly crystalline starting polymer is prepared according to the processes set out in United States Patent 3,000,861 which has a predominance of chains of the general formula

$$HO\text{---}(CH_2\text{---}O)_nH$$

wherein $n$ is an integer preferably 300 or larger. Polymer molecules having this combination of end groups are hereinafter referred to as Type B structures. Additional crystalline polymers which are operable in this process include those obtained by irradiation of trioxane with high energy electrons.

When the present process is applied to structures hereinabove identified generally as Type A, a mixture consisting essentially of (1) molecules of higher molecular weight than the starting material having R groups on both ends which are designated herein as Type C structures, (2) molecules which have had the R groups removed and which may couple to form Types B and C, and (3) unreacted molecules of Type A. If the above mixture is stabilized by esterification, it would yield a mixture of polymers of the general formula (1) 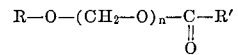

$$R\text{---}O\text{---}(CH_2\text{---}O)_n\text{---}\underset{O}{\overset{\parallel}{C}}\text{---}R'$$

wherein R' is an alkyl, cycloalkyl, or aralkyl radical. For present purposes, these polymers are referred to as Type D structures.

(2) 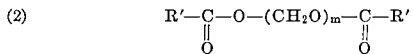

$$R'\text{---}\underset{O}{\overset{\parallel}{C}}\text{---}O\text{---}(CH_2O)_m\text{---}\underset{O}{\overset{\parallel}{C}}\text{---}R'$$

wherein R' is defined as in (1) above. These polymers are referred to as Type E structures, and (3) Unreacted polymer of Type C.

The number average molecular weight of Types C, D, and E and mixtures thereof may be determined as hereinafter described. If polymers treated according to the present process (A, B, and C) are subsequently stabilized by known alkylation techniques, the resulting polymer will be predominantly Type C.

If the present process is applied to polymers of Type B, the following products may be obtained (1) two or more of the starting Type B polymers coupled by an acid catalyzed acetal formation between pairs of the original end groups which polymer contains the same end groups as original Type B and (2) unreacted starting material. Esterification of this mixture yields predominantly Type E molecules, while alkylation yields Type C molecules.

If subsequent stabilization of the present products is undesirable, Type A and B components may be removed by dissolving the etherified mixture and heating the solution in the presence of a strong amine or a caustic to depolymerize Type A and B polymers. Solvents which may be used in the presence of an amine include the aliphatic and aromatic hydroxy compounds, such as cyclohexanol, glycol, benzyl alcohol and phenol, and the preferred solvents for the caustic treatment are ethers, such as trioxymethylene dimethyl ether and diethylene glycol dimethyl ether. Bases which are useful in the purification step include ammonia; nitrogen-containing heterocyclics; mono-, di-, and trialkyl amines and mono-, di-, and triaryl amines, e.g., triethyl amine and tripropyl amine; and alkalimetal and alkaline earth metal hydroxides, e.g., sodium hydroxide and potassium hydroxide. Another procedure which may be employed for the removal of the Type A and B as well as other types of unreacted polyoxymethylene is the thermal degradation of the solid or the molten polymer, or of the polymer in solution in the absence of an amine or a caustic.

The number average molecular weights of the stabilized products herein may be measured by the classical methods of osometry, although these methods are cumbersome and are not particularly suitable for the lower range of molecular weight. Another method for molecular weight determination is the measurement of inherent viscosity of the polymer, and since this method of measurement bears a direct relationship to the weight average molecular weight for most systems, it is used herein to characterize the polymers. The inherent viscosity (I.V.) is measured by dissolving 0.125 gram of the stabilized polymer in 25 ml. of reagent grade phenol which has been purified by distillation from solid caustic. The polymer is not readily soluble in phenol at room temperature, and usually the mixture is heated to 120° C. to increase the rate of solution of the polymer. The viscosity of the phenol solvent and the viscosity of the phenol polymer solution is measured at 90° C. by noting the time required to pass the same volume of each material through an Ostwald viscometer. The I.V. is then determined by using the formula $$\frac{2.303 \times \text{weight of polymer in}}{100 \text{ cc. of phenol solution}} \times \log \frac{\text{time of solution}}{\text{time of solvent}}$$

Since the process of the present invention also affects the number average molecular weight of the polymers, measurements of this quantity are performed. The number average molecular weight may be determined by analysis of the end-groups on the polymer chain for the five principal categories of polymers (Types A, B, C, D, and E) described hereinabove. The first, the Type A, category of polymers has an equal number of alkoxyl and hydroxyl end groups and is derived principally from polymerization in an alcoholic medium. The Type C category of polymers has predominately alkoxyl groups and, for the most part, are polymers which have been treated to replace less stable end-groups with OR groups where R is methyl, ethyl, etc. The polymers which have been treated according to the process of the present invention and subsequently recovered from solution in an alcohol-amine mixture fall within Type C. The Type D category of polymers has both alkoxyl and carboxyl ends—the carboxyl ends being derived from the replacement of unstable end-groups by treatment of the polymer with an acid anhydride. By determining the total concentration of all of the end-groups present in a mixture of any combination of the five types, and assuming the chains are linear, i.e. only two end-groups per polymer chain, the value of the number average molecular weight $\overline{M}_n$ may be calculated. The number of alkoxyl (methoxyl) groups may be determined according to the Zeisel Method reported in "Official Methods of Analysis of the Association of Official Agricultural Chemists," 7th ed., A.O.A.C., Washington, D.C. (1950), pages 744–745. The number of hydroxyl groups and consequently the $\overline{M}_n$ may be determined according to the following procedure.

A film is pressed from the polymer to be tested—the film being translucent and crack-free and about 5 mils in thickness, and being pressed at room temperature and at a pressure of about 35,000 p.s.i. The film is then scanned by a Perkin-Elmer Model 21 spectrophotometer (or its equivalent) equipped with calcium fluoride optics. The absorbance is measured at 2.9 microns (for hydroxyl) and at 2.54 microns for total oxymethylene chain. The baseline for the 2.54 band is a line joining the minimum absorbance at 2.1 microns to the minimum absorbance at 2.7 microns. The baseline for the 2.9 band is a line joining the minimum absorbance at 2.7 microns with the minimum absorbance at 3.0 microns. The equation for calculating number average molecular weight from these measurements of infrared absorbance is:

$$\overline{M}_n = \frac{x \times (7850)}{\left(\frac{\text{absorbance at 2.9 microns}}{\text{absorbance at 2.54 microns}}\right)}$$

where $\overline{M}_n$ is the number average molecular weight and $x$ is the number of hydroxyls per polymer molecule.

The carbonyl content is determined by preparing and scanning a polymer sample as set forth above. The absorbance is measured at 5.69 microns for the carbonyl group and 2.54 microns for the total oxymethylene chain with $\overline{M}_n$ being determined according to the following equations:

$$\frac{\text{carbonyl groups}}{1000 \text{ HCHO units}} = 1.27 \left(\frac{\text{absorbance at 5.69 microns}}{\text{absorbance at 2.54 microns}}\right)$$

$$\overline{M}_n = \frac{60,000}{\frac{\text{carbonyl groups}}{1000 \text{ HCHO units}} + \frac{\text{methoxyl groups}}{1000 \text{ HCHO units}}}$$

The following examples are presented to illustrate and not to restrict the present invention. Parts and percentages are based on weight unless otherwise specified. Measurements are made in the manner described above.

EXAMPLES I TO VI

These examples illustrate the modification of molecular weight employing a slurry of polyoxymethylene in various solvents and with various acids. Table I shows the characterization of the starting material as to inherent viscosity and molecular weight which was a substantially 100% crystalline polyoxymethylene prepared according to the process set forth in United States Patent 3,000,860, issued to N. Brown et al. on September 19, 1961.

To a 100 ml. dry flask was charged the indicated amount of polymer having the molecular weight shown along with a solvent and catalyst as indicated. The flask was placed in an oil bath at the indicated temperature for the time specified with no agitation. The slurry was then removed from the flask and cooled slowly to room temperature, whereupon the polymer was recovered by filtration and reslurried once with p-dioxane, 3 times with reagent-grade methanol, and 2 times with reagent-grade acetone, following which the polymer was dried at room temperature by passing air therethrough until a constant weight of material was obtained. The amount of polymer and the molecular weight are shown in the following table. It should be noted that the average increase in weight average molecular weight as evidenced by the increase in inherent viscosity was approximately 50% and varied from 28% to 66%. The products described in the foregoing examples were stabilized by treatment with an acid anhydride by weighing a quantity of the material and propionic anhydride into an agitated flask, following which the flask was evacuated to remove air entrained with the polymer. Nitrogen was then bled into the flask until a pressure was slightly above 1 atmosphere, following which the flask was thoroughly flushed with nitrogen. On completion of the nitrogen purge, the reactor was heated until the slurry therein reached a temperature of about 150° C., whereupon the pressure was increased to about 800 mm. of Hg absolute. By the time the temperature reached 171°, all the polymer was in solution; and the heat was removed, the pressure bled off, and the reactor allowed to cool. After the slurry precipitated, it was filtered and washed several times with acetone by reslurrying on the filter. The washed product was then dried in a vacuum oven and exhibited an excellent thermal stability on the order of 0.1% by weight per minute in vacuum at 259° C. The yield of polymer in this stabilization treatment was usually greater than 96%.

EXAMPLE VII

This example illustrates the modification of molecular weight under conditions comparable with those of Example II, but employing a starting material made by polymerizing solid trioxane by means of high energy electron irradiation. Table I shows the characterization of the treated product as measured after washing, drying, and stabilization with propionic anhydride as described in Example I.

EXAMPLES VIII TO XV

Substantially 100% crystalline polyoxymethylene which was prepared according to the technique described in the foregoing examples was employed in the present examination. Table II shows the characterization of the various polymers employed as to inherent viscosity, molecular weight, and the amount of material originally charged to the reactor. The modification of molecular weight of this polymer was affected by contacting a weight amount of the material with a vapor stream which contained the acid. A cylindrical glass vessel which had a porous fritted bottom, a vapor outlet exit below the frit, and a vapor inlet above the frit was used as a reactor. The frit retained the polymer. The temperature was controlled by immersing the reactor in a controlled temperature oil bath. The indicated amount of dry polymer was charged to the reactor and the reactor was flushed with nitrogen for 10 minutes, following which it was lowered into an oil bath, maintained at the indicated temperature, and preheated for 10 minutes while maintaining the nitrogen flow through the polymer bed, whereupon a nitrogen stream satuarted with the indicated amount of acid was passed downflow through the reactor for the time specified. Following the treatment of the polymer with acid, the reactor was sparged with dry nitrogen for 5 minutes at the reaction temperature, following which the reactor was removed from the bath and cooled to room temperature continuing the nitrogen purge. The product was then removed and weighed. The yield is reported in Table II. Some of the modified polymers were then treated under basic conditions by heating the polymer in a benzyl alcohol solution containing 1% n-tripropyl amine at 160° C. to determine the percentage of the modified product which was stable to the base. This fraction is reported in Table II. Some of the polymer was subsequently stabilized in a manner similar to that described for the polymer shown in Examples I through VI, and was found to exhibit excellent thermal stability and physical properties sufficient to permit classification of these polymers as commercially attractive materials.

The present polymers as well as other oxymethylene homopolymers and copolymers may be extruded into substantially void-free solid strands for subsequent cutting of these strands into conventional molding powder by adjustment of the quenching process to form a thin film of solidified polymer on the outside of the strands by contacting the strands with a coolant such as water, and thereafter permitting the strands or cubes to cool more slowly in a less efficient cooling medium such as air. The temperature of the cube exit the strand cutter should be maintained between 130–160° C. by adjustment of the cooling, and the initial coolant should be completely removed from the strands when the secondary medium is reached to prevent localized over-cooling and subsequent void formation. After the strands are cut, the cubes obtained thereby are cooled slowly in a gaseous purge. Standard devices for removal of the initial cooling medium include, but are limited to, an air knife or sponge located at a regulated distance from the discharge of the extruder. If an air knife is employed, it should be adjustde to direct air at an angle of from 10 to 40° from a perpendicular line of the strands. A suitable conveyor may be provided to direct the strands to the cutter and to retain the initial cooling medium.

The polymers of this invention find widespread utility in the production of film by pressing or extrusion, spinning of fibers, filaments, or bristle material and injection molding of gears and like items. The modified polymer of this invention has remarkable thermal stability and good resistance to degradation and basic media as shown in the foregoing examples.

*Table I*

| Example | Starting Polymer | | | Reaction Medium | | Acid | | Conditions | | Modified Polymer | |
|---|---|---|---|---|---|---|---|---|---|---|---|
| | Inherent Viscosity | $\overline{M_n}$ | Weight in Grams | Composition | Weight in Grams | Composition | Weight in Grams | Time, Hrs. | Temperature, °C. | Inherent Viscosity | Weight in Grams |
| 1 | 0.50 | 20,400 | 9.93 | Cyclohexane | 117 | $BF_3 \cdot O(CH_3)_2$ | 1.24 | 22 | 27 | 0.83 | 9.79 |
| 2 | 0.50 | 20,400 | 10.48 | 1,4 dioxane | 103 | $BF_3 \cdot O(CH_3)_2$ | 1.24 | 24 | 27 | 0.72 | 10.26 |
| 3 | 0.50 | 20,400 | 4.98 | ___do___ | 83 | $H_2SO_4$ | 0.075 | 155 | 60 | 0.81 | 4.8625 |
| 4 | 0.50 | 20,400 | 4.99 | ___do___ | 83 | $H_2SO_4$ | 0.075 | 24 | 38 | 0.79 | 4.84 |
| 5 | 0.50 | 20,400 | 9.88 | ___do___ | 103 | $BF_3 \cdot O(CH_3)_2$ | 1.24 | 5 | 60 | 0.70 | 9.22 |
| 6 | 0.50 | 20,400 | 10.07 | Benzene | 132 | $BF_3 \cdot O(CH_3)_2$ | 1.24 | 22 | 27 | 0.64 | 9.32 |
| 7 | 1.26 | (1) | 0.6148 | 1,4 dioxane | 35 | $BF_3 \cdot O(CH_3)_2$ | 1.24 | 18 | ca. 27 | 1.35 | 0.6043 |

[1] Not measured.

*Table II*

| Example | Starting Polymer | | | Conditions | | Acid | | Modified Polymer | | | |
|---|---|---|---|---|---|---|---|---|---|---|---|
| | Inherent Viscosity | $\overline{M_n}$ | Weight in Grams | Time, Mins. | Temperature, °C. | Composition | Weight in Grams, mole percent | Inherent Viscosity | $\overline{M_n}$ | Yield | Base Stable Fraction |
| 8 | 0.69 | 35,000 | 35.00 | 10 | 160 | $BF_3 \cdot O(CH_3)_2$ in $N_2$ | 5 | 1.48 | 48,700 | 94.0 | (1) |
| 9 | 0.73 | 39,000 | 52.30 | 5 | 160 | $BF_3 \cdot O(CH_3)_2$ in $N_2$ | 0.62 | 1.35 | 58,100 | 92.9 | 0.436 |
| 10 | 0.50 | 20,400 | 31.40 | 5 | 160 | $PBr_3$ in $N_2$ | 0.46 | 0.63 | 23,900 | 90.8 | (1) |
| 11 | 0.50 | 20,400 | 30.16 | 2 | 160 | $SnCl_4$ in $N_2$ | 0.70 | 0.76 | 29,300 | 89.0 | (1) |
| 12 | 0.50 | 20,400 | 20.00 | 5 | 140 | $BF_3 \cdot O(CH_3)_2$ in $N_2$ | 0.30 | 0.92 | 42,900 | 93.6 | 0.38 |
| 13 | 0.50 | 20,400 | 20.00 | 5 | 175 | $BF_3 \cdot O(CH_3)_2$ in $N_2$ | 0.30 | 0.93 | 41,000 | 89.4 | 0.40 |
| 14 | 0.76 | 29,300 | 9.96 | 10 | 160 | $BF_3 \cdot O(CH_3)_2$ in $N_2$ | 0.30 | 1.60 | 72,300 | 89.8 | 0.43 |
| 15 | 0.48 | 13,800 | 9.99 | 10 | 160 | $BF_3 \cdot O(CH_3)_2$ in $N_2$ | 0.30 | 1.04 | 31,600 | 86.4 | 0.465 |

[1] Not measured.

We claim:
1. A process for modifying the molecular weight of a normally solid, substantially 100% crystalline polyoxymethylene having a molecular weight of at least 10,000 which consists of contacting said starting material with a Lewis acid, selected from the class consisting of oxonium salts, boron trifluoride, aluminum trichloride, tin tetrachloride, and titanium tetrafluoride, and thereafter recovering a polyoxymethylene having a molecular weight greater than that of said starting material.

2. The process of claim 1 wherein the starting material is dispersed in an inert organic solvent.

3. The process of claim 1 wherein the starting material is in the form of a solid, and the acid is in the form of a vapor.

4. The process of claim 3 wherein said polyoxymethylene starting material is in the form of a solid, and said Lewis acid is in the form of a vapor.

5. The process of claim 4 wherein said Lewis acid is boron trifluoride.

6. A process for modifying the molecular weight of a substantially 100% crystalline polyoxymethylene starting material having a molecular weight of at least 10,000 which consists of contacting 100 parts of said starting material with at least $1 \times 10^{-4}$ parts of a Lewis acid at a temperature of from $-50$ to $175°$ C., and thereafter recovering a polyoxymethylene having a molecular weight higher than that of said starting material.

7. A process for preparing a polymer having the general formula

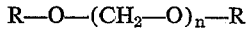
R—O—(CH$_2$—O)$_n$—R wherein R is a member of the group consisting of alkyl, cycloalkyl, and aralkyl, and $n$ is a positive integer of at least 300, which consists of contacting a substantially 100% crystalline starting material having the general formula

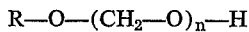
R—O—(CH$_2$—O)$_n$—H wherein R is a member of the group consisting of alkyl, cycloalkyl, and aralkyl, and $n$ is a positive integer of at least 300, with an acid, and thereafter recovering said polymer having a molecular weight higher than that of said starting material.

8. The process of claim 7 wherein said acid is a Lewis acid.

9. A process for modifying the molecular weight of a preformed, substantially 100% crystalline polyoxymethylene starting material having a molecular weight of at least 10,000 which consists of contacting said starting material with an acid, and thereafter recovering a polyoxymethylene having a molecular weight greater than that of said starting material.

10. The process of claim 9 wherein said acid is a Lewis acid.

References Cited by the Examiner

UNITED STATES PATENTS

| | | | |
|---|---|---|---|
| 2,795,571 | 6/1957 | Schneider | 260—67 |
| 2,989,508 | 6/1961 | Hudgin et al. | 260—67 |
| 3,000,860 | 9/1961 | Brown et al. | 260—67 |
| 3,000,861 | 9/1961 | Brown et al. | 260—67 |
| 3,061,589 | 10/1962 | Codignola et al. | 260—67 |
| 3,071,564 | 1/1961 | DeFazio et al. | 260—67 |

OTHER REFERENCES

583,593, Derwent Patent Reports, 62A (February 1960), p. A22.

Whitmore: Organic Chemistry (2nd ed.), D. Van Nostrand Co., N.Y., 1951, pp. 138–143.

WILLIAM H. SHORT, *Primary Examiner.*